Patented Mar. 19, 1946

2,396,692

UNITED STATES PATENT OFFICE 2,396,692

PRODUCTION OF ORGANIC SILICON COMPOUNDS

Philip James Garner, Northwich, England, assignor to Imperial Chemical Industries Limited, a corporation of Great Britain No Drawing. Application January 22, 1942, Serial No. 427,843. In Great Britain June 6, 1940

4 Claims. (Cl. 260—80)

This invention relates to the production of new organic silicon compounds, apparently polymers of high molecular weight.

Various organic esters of orthosilicic acid are known, of general formula

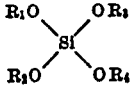

where $R_1$, $R_2$, $R_3$ and $R_4$ are similar or dissimilar mono-valent organic radicles. Derivatives of such esters are also known in which three or less of the ester groups are replaced by other organic groups such as alkyl or aryl radicles. These derivatives and the original esters all possess the group

and their general formula may be written as:

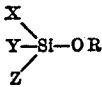

where X, Y and Z are R or OR groups and where R is a saturated or unsaturated, alkyl, aryl, aralkyl or heterocyclic radicle.

It is known that saturated alkyl silicates in general can be converted into polysilicates by condensations between silicon and oxygen atoms of different molecules and elimination of one or more alcohol or water molecules.

I have found that if one or more of the ester groups in these esters or their derivatives contains a carbon-carbon double bond, they may be converted into solid polymers by the action of heat. At slightly elevated temperatures I have found that the reaction, if any, only proceeds very slowly, but at or about the boiling point the polymerisation proceeds at a practicable rate. If the temperature is too high, the silicon ester chars without polymerising.

According to the invention, therefore, organic silicon esters having at least one ester group containing one or more carbon-carbon double bonds are converted into new solid polymers or interpolymers by heating at an elevated temperature not exceeding the critical temperature of the reactants, and a pressure sufficient to maintain a liquid phase present.

Suitable unsaturated radicles containing one or more carbon-carbon double bonds include the vinyl, allyl, crotonyl, isobutenyl $CH_2{:}C(CH_3)CH_2$ or so-called methallyl, and furyl radicles and derivatives thereof. All radicles which include at least one carbon-carbon double bond and are capable of forming esters are included within the scope of the invention.

In suitable initial organic silicon compounds, at least one radicle with a carbon-carbon double bond must be attached to the silicon through an oxygen atom, but the remaining radicles may be attached either directly or through other oxygen atoms. The remaining radicles may be similar or dissimilar, and any or all of them may be unsaturated.

Thus the following types of compounds may be employed:

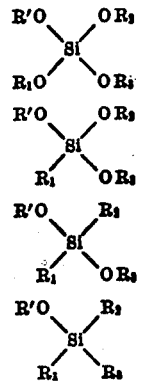

where R' is an unsaturated, alkyl or aralkyl radicle with a carbon-carbon double bond; $R_1$, $R_2$ and $R_3$ are similar or dissimilar, saturated or unsaturated, alkyl, aryl, aralkyl or heterocyclic radicles.

In a preferred form of the invention symmetrical unsaturated orthosilicate esters, i. e. compounds of general formula $Si(OR')_4$, are employed. Examples of such esters are allyl, isobutenyl, crotonyl and furyl orthosilicates.

The polymerisation is effected in the liquid phase and at temperatures not exceeding the critical temperature of the reactants, preferably at about 180°–280° C. At the preferred temperatures, about 6–40 hours are required for the polymerisation to take place to give a hard transparent solid, but solids which are not quite so hard can be obtained within a few hours. At temperatures much below 200° C., considerably longer times of reaction are required. At temperatures between about 300° C. and 400° C., there is a tendency for the reactants to decompose and thus colour the resulting product, and at still higher temperatures the monomers tend to char and decompose without polymerising.

Polymerisation catalysts may be employed if desired. I have found that the rate of reaction is accelerated without appreciably influencing the appearance or hardness of the final product by incorporating a small proportion of oxygen or benzoyl peroxide or other well known polymerisation catalyst such as per-compounds in general. A quantity of the order of 0.1–1 part of benzoyl peroxide per 100 parts of the initial silicon monomer, or slight traces of oxygen, reduce the time required for polymerisation to little more than one-half that required in the absence of a catalyst.

As the polymerisation is effected in the liquid phase, the pressure on the system must be sufficient to maintain a liquid phase present at the operating temperature. Higher pressures may be employed if desired, and we have found that the reaction may be appreciably speeded-up by compressing the reactants to high pressures. At 250° C., by increasing the pressure from the natural vapour pressure (about one atmosphere or less) to 3000 atmospheres, the time required for polymerisation can be reduced from about 8-40 hours to about 5-20 hours, and still further reduction can be made by increasing the pressure to, say, 12000 atmospheres. The use of such high pressures is not always desirable however, as it often gives products which have internal strains sufficient to cause fractures. For this reason, and for general convenience, I prefer to work at pressures of or not much greater than the natural vapour pressure of the system.

The rate of reaction and the hardness and transparency of the product are sometimes adversely affected by impurities in the initial silicon monomers. The monomers may be prepared for example from silicon tetrachloride by reaction with ethanol in the presence of benzene and fractionating ethyl ortho-silicate at 165-170° C., then replacing the ethyl groups from this intermediate product by unsaturated hydrocarbon radicles by reacting with a large excess of the corresponding unsaturated alcohol and distilling off the ethanol. The unsaturated orthosilicate remaining may then be purified if desired by distilling under reduced pressure such as 2-20 mms. of mercury or, if a solid, it may be recrystallised from solution in the usual organic solvents such as alcohols, aliphatic or aromatic hydrocarbons, chlorinated solvents, esters and ethers.

The invention is illustrated, though not restricted, by the following examples:

*Example 1*

Freshly distilled, liquid isobutenyl orthosilicate $Si(O.CH_2.C(CH_3):CH_2)_4$ is placed in a glass tube which is then evacuated and sealed off. The sealed tube is then heated at 250° C. for about 40 hours. The tube is cooled and opened and the product obtained is a clear, hard transparent solid, which shows excellent resistance to scratching, is insoluble in all solvents and does not soften below 300° C.

*Example 2*

0.5% benzoyl peroxide is dissolved in freshly distilled isobutenyl orthosilicate which is then treated as in Example 1, when a similar product is obtained. The reaction proceeds rather faster than in Example 1, substantially complete polymerisation being effected in about 25 hours.

*Example 3*

Allyl orthosilicate is held at a temperature of 250° C. under 3000 atmospheres pressure for 15 to 20 hours. A hard, highly scratch-resistant, transparent solid is obtained which is insoluble in all ordinary solvents and does not soften below 300° C. It is more brittle than the product obtained by polymerisation at atmospheric pressure and has a different appearance in that it glistens, presumably owing to the reflection of light at discontinuities within the material.

*Example 4*

Isobutenyl orthosilicate is heated in a sealed glass tube at 270° C. for 20 hours. The tube is then opened and the product obtained is similar in appearance to that of Example 1.

The products obtained by this process are generally hard transparent solids of good scratch resistance. They are generally colourless, but may be obtained as pale yellow or deeply coloured solids if desired. Their hardness exceeds that of most other transparent polymers at present available, and they are sufficiently elastic to recover small indentations within a few seconds. They are also more resistant to scratching than other transparent polymers, and any scratches made on them can readily be removed by gentle polishing. They are remarkably transparent, even when slightly coloured. They are insoluble in all the usual solvents such as alcohols, aliphatic or aromatic hydrocarbons, chlorinated solvents, esters and ethers, and do not soften at 300° C. This makes them unsuitable for moulding into shapes by the usual technique, but they may be obtained as simple castings by carrying out the process in a mould of the desired shape. They can also be sawn, turned in a lathe, ground and polished, and thus simple shapes such as plates, cylinders and the like can readily be obtained. In these forms they are of especial value for optical purposes such as lenses, being more readily manufactured in the desired shape than the usual inorganic glasses, and unaffected by hot climatic conditions unlike the organic resins sometimes employed for this purpose.

I claim:

1. Process of polymerizing a compound having the formula $Si(OR')_4$ in which R' is a radical from the group consisting of the allyl, isobutenyl, crotonyl, and furyl radicals, which process comprises heating said compound, in liquid phase, at a temperature of 180° C.-280° C. under at least autogenous pressure in the absence of other polymerizable compounds tending to promote polymerization of said compound, until a solid polymer is obtained.

2. Process of polymerizing a compound having the formula $Si(OR')_4$ in which R' is a radical from the group consisting of the allyl, isobutenyl, crotonyl, and furyl radicals, which process comprises heating said compound, in liquid phase, at a temperature of 180° C.-280° C. under autogenous pressure in the absence of other polymerizable compounds tending to promote polymerization of said compound, until a solid polymer is obtained.

3. Process of polymerizing allyl orthosilicate comprising heating said allyl orthosilicate, in liquid phase, at a temperature of 180° C.-280° C. under at least autogenous pressure in the absence of other polymerizable compounds tending to promote polymerization of said allyl orthosilicate, until a solid polymer is obtained.

4. Process of polymerizing isobutenyl orthosilicate comprising heating said isobutenyl orthosilicate, in liquid phase, at a temperature of 180° C.-280° C. under at least autogenous pressure in the absence of other polymerizable compounds tending to promote polymerization of said isobutenyl orthosilicate, until a solid polymer is obtained.

PHILIP J. GARNER.